W. M. SCHILLING
*INVENTOR.*

BY  *Ernest G. Peterson*

AGENT 3,222,437
PROCESS FOR SIMULTANEOUSLY MOLDING AND EXPANDING STEREOREGULAR POLYPROPYLENE TO FORM A HINGE
William M. Schilling, West Chester, Pa., assignor to Hercules Powder Company, Wilmington, Del., a corporation of Delaware
Filed June 18, 1962, Ser. No. 203,214
2 Claims. (Cl. 264—54)

This invention relates to a novel process of molding an article of manufacture from stereoregular polypropylene and embodying an integral hinge.

Among the many thermoplastic polymers which have been developed in recent years, one of the more useful is stereoregular polypropylene, i.e., the commercial crystallizable polymer of propylene having an ordered head-to-tail structure. Because of its outstanding physical and chemical properties, this polymer has found wide acceptance for use in making films and fibers and many types of molded, shaped articles.

One particularly valuable property of stereoregular polypropylene is its extremely high resistance to flex fatigue which makes it virtually impossible to break this polymer by flexing it. In fact, because of cold flow orientation which takes place on flexing, it appears to increase in strength with repeated flexings. For example, when tested in the M.I.T. flex testing apparatus, stereoregular polypropylene has withstood thousands of flexings without breaking.

Limited use of this property has been made in the past in the manufacture of various types of molded containers such as key cases, spectacle cases, and the like molded in one piece and having formed therein an integral, flexible hinge portion that is relatively thin in comparison to the average thickness of the container.

It has been proposed that this property could find application in the manufacture of such hinged items as loose-leaf notebook covers, doors with integral hinges and the like. However, in order to get the required amount of rigidity in these larger structures, it has been necessary to make them so thick as to make them economically unattractive when compared to the materials presently used in their manufacture.

It has now been discovered that useful molded articles having an integral, or molded-in, hinge can be manufactured economically from foamed, i.e., expanded, stereoregular polypropylene.

The molded articles of the invention comprise at least two body portions of expanded stereoregular polypropylene of substantially uniform thickness each of which is integrally joined along a straight line to an adjacent body portion through an interconnecting portion of substantially unexpanded polypropylene. The interconnecting portion is relatively thin in comparison to the body portions so that the body portions are capable of being flexed along the thin interconnecting portion, which thus serves as a hinge.

The resulting structures can comprise two expanded portions connected by a single hinge portion as in a cabinet door assembly, three foamed portions each connected to the adjacent portion by a hinge portion as in a loose-leaf notebook cover, or an even greater number of foamed portions. Alternatively, the relatively thin, substantially unexpanded hinge portion need not serve as a hinge in the sense of being subjected to continual flexing. For instance, a one piece flat preform for a box, duct, or other type of three dimensional structure can be made which can be folded along the relatively thin portions and then heat sealed or adhesively secured along the unconnected edges thus brought into contact with each other.

The articles of the invention can be made by several different processes. According to one process, a sheet or preform of stereoregular polypropylene containing a blowing agent is heated in a mold of greater thickness than the sheet at a temperature sufficient to decompose the blowing agent while a straight and narrow portion of the sheet is substantially restrained from expanding. Restraining of the straight and narrow portion from expanding can be effected, for instance, by the use of an elongated V-shaped projection on one part of the mold or of an elongated V-shaped insert, in either case the V-shaped projection or insert being of sufficient depth as to leave only a relatively small clearance, e.g., about 4 to 30 mils, between the base of the V and one side of the mold. After cooling, the shaped article is removed from the mold and flexed along the substantially straight and unexpanded portion to form the hinge.

Alternatively, the preform of expandable polypropylene may be expanded in the mold without restraint in any area and the relatively thin portion required as a hinge can be formed thereafter. For instance, after removal of the expanded preform or slab from the mold, it can be contacted in the locus where it is desired to form the hinge by an elongated V-shaped metal bar heated to a temperature sufficient to fuse the stereoregular polypropylene with which it comes in contact, thereby collapsing the expanded polypropylene, leaving a straight, relatively thin portion of unfoamed polypropylene which will serve as the hinge.

An expanded preform can also be formed by extruding the polymer containing the blowing agent in known manner under properly controlled conditions to yield an expanded sheet. Portions of this expanded sheet can then be treated in the manner outlined in the preceding paragraph to form the desired hinge portion.

While the preceding disclosure mentions formation of the relatively thin unexpanded portion only on one surface of the article, it is desirable in some applications to form the article with opposing V-shaped indentations on both sides of the preform so as to have the substantially unfoamed portion located in the center of the cross-section of the article rather than coincident with one or the other of its surfaces.

It should be understood that in referring to the restraining member and the projection attached to the mold for the purpose of forming the relatively thin section to act as a hinge, the description of that member as "V-shaped" is not to be construed as a strict limitation of the invention. Rather it is a term of convenience used to convey the concept of steadily increasing width from top to bottom. Thus, for instance, the restraining member or its equivalent need not be exactly V-shaped but can be V-shaped, semi-circular, or in the shape of a truncated V.

A clearer understanding of the invention can be gained from the attached drawing in which.

Figure 1:
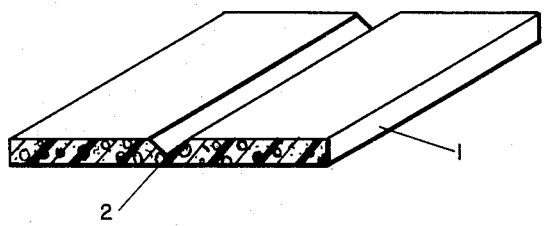
FIG. 1 is a perspective view of a flat article molded according to the invention from expanded stereoregular polypropylene and embodying an integral hinge.

Referring more specifically to the drawings, in FIG. 1 reference numeral 1 represents a flat article of expanded stereoregular polypropylene having a V-shaped indentation at the base of which lies a substantially unexpanded portion 2 running the width of the article to serve as a hinge.

Figure 2:
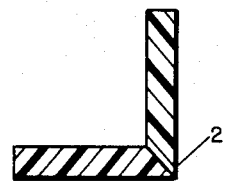
FIG. 2 is a section view of a flat article molded from expanded stereoregular polypropylene which has been folded on the axis of the integral hinge.

In FIG. 2 the expanded polypropylene article of FIG. 1 is shown flexed along the substantially unexpanded hinge portion 2. The expanded article may be permanently fixed in this position by fusion or by means of an adhesive compound to form a dihedral angle as in a box or similar three-dimensional structure.

Figure 3:
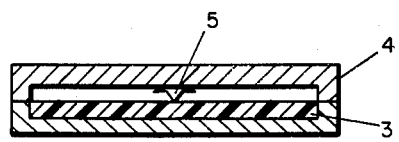
FIG. 3 is a cross sectional view of a mold with a V-shaped insert attached thereto and containing a preform of expandable stereoregular polypropylene prior to expanding.

In FIG. 3, a preform of expandable polypropylene is shown schematically in a mold 4 having a V-shaped insert 5 attached thereto which touches or nearly touches the preform 3. The preform 3 is represented in its unexpanded state with the mold 4 in position to confine and shape the article when heat is applied to activate the blowing agent. Depending upon the specific article it is desired to mold, there may be one or several V-shaped projections 5.

Figure 4:
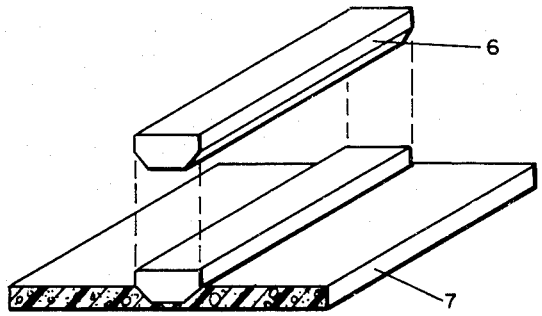
FIG. 4 is a perspective view of an alternative embodiment of the invention wherein a slab of expanded polypropylene is contacted with a heated metal bar to collapse the foam and form the hinge.

In the alternative embodiment of the invention shown in FIG. 4, a heated, V-shaped metal bar 6 has been brought by external means (not shown) into contact with an expanded polypropylene slab 7 in order to melt the polypropylene and collapse the foam in the portion which is to serve as the hinge.

The articles of the invention, being formed of foamed or expanded polypropylene, have the advantage that in addition to possessing the desirable chemical properties of unfoamed polypropylene—i.e., durability, chemical inertness, etc.—because of the cellular structure created by the gas released by the blowing agent, they have greater strength, and greater rigidity than a corresponding mass of unfoamed material. Accordingly, such articles can be produced more economically since relatively less polypropylene will be required to produce articles thick enough to have the required strength and rigidity. In addition, the gas entrapped within the cellular structure created by the foaming or expanding operation gives the structures an efficient, valuable heat-insulating capability. The material thus becomes useful in a wider range of applications than are open to unexpanded polypropylene structures. For example, lightweight, thermally insulated doors with integral hinges can be produced either for the building industry or for many types of cabinets or containers.

Example 1

An unexpanded sheet of stereoregular polypropylene, 0.020 inch thick, containing dispersed therein 2.5% by weight of azobisformamide as blowing agent, was placed in a 0.25 inch picture frame type mold. A V-shaped metal insert of the same length as the mold and 0.23 inch high was placed on the sheet along the line where it was desired to form the hinge. The mold was closed and heated in an oven at 425° F., until the polypropylene sheet had expanded to 0.25 inch thickness in the unrestrained areas, leaving a substantially unexpanded portion beneath the metal insert. Immediately upon removal from the mold, this unexpanded area was flexed to orient the polymer along the line of the hinge and the hinge withstood repeated flexings thereafter without breaking.

By use of a plurality of inserts in the procedure of Example 1, it is possible by the same procedure to produce items having more than one hinge and more than two expanded portions, each connected to the next adjacent portion by an integral, substantially unexpanded hinge portion.

Example 2

A stereoregular polypropylene slab was expanded in the manner shown in Example 1 except that the V-shaped metal insert was omitted from the mold. After cooling, the expanded slab was removed from the mold and contacted along its center line with one apex of a triangular shaped, electrically heated metal bar. Heat was applied only for a long enough time to fuse the polymer at the contact point, allowing the expansion gas to escape and collapsing the foam to a depth of ⅛ inch resulting in a flat structure with a relatively thinner section along the line contacted by the heated bar. Upon the cooling and solidifying of the thermally softened section to form a smooth skin, a structure results identical to that produced in Example 1 except that the polymer remaining in the thinner portion is expanded to the same degree as that found in the adjacent body portions of the structure. Immediately thereafter, the thinner portion was flexed to orient the polymer and even though the thinner portion consisted of foamed polymer, it resisted flexings thereafter.

The technique of expanding the polymer is well known and needs no elaboration. Briefly, the blowing agent is incorporated into the polymer in the powder state by any known technique for intimately admixing solid materials while maintaining the temperature below the decomposition temperature of the blowing agent. After admixing of the solids, the polymer-blowing agent composition is formed into a suitable sheet, slab, or polymer at a temperature below the decomposition temperature of the blowing agent.

As practiced in the art, the blowing agent desirably has a decomposition temperature somewhat above the crystalline melting point of stereoregular polypropylene. Typical of such blowing agents, in addition to azobisformamide, are N,N-dinitrosopentamethylenetetramine, and p,p'-oxy-bis(benzene sulfonyl semicarbazide).

perature below the decomposition temperature of the

What I claim and desire to protect by Letters Patent is:

1. A process for simultaneously molding and expanding stereoregular polypropylene to produce an article of manufacture comprising two body portions of expanded stereoregular polypropylene of substantially uniform thickness joined by an integrally molded hinge of substantially unexpanded stereoregular polypropylene which comprises heating in a mold a sheet of unexpanded stereoregular polypropylene having a blowing agent admixed therewith and causing the major portions of said sheet to expand to a uniform thickness while restraining a straight and relatively narrow section of said sheet from expanding by contacting during the period when expansion is being effected, at least one surface of the area which is to serve as the aforesaid straight and narrow section with an elongated substantially V-shaped member within the mold.

2. A process for simultaneously molding and expanding streeoregular polypropylene to produce a preform structure having a plurality of body sections of expanded stereoregular polypropylene and a plurality of fold lines comprised of relatively thin areas of substantially unexpanded stereoregular polypropylene whereby the said preform structure can be folded to form a three-dimensional structure which comprises heating in a mold a sheet of unexpanded stereoregular polypropylene having a blowing agent admixed therewith and causing the major portions of the sheet to expand to a substantially uniform thickness while restraining from expanding those areas of the sheet which are to serve as fold lines, said restraining being accomplished by contacting, during the period when expansion is being effected, at least one surface of each area which is to serve as a fold line, with an elongated, substantially V-shaped member within the mold.

References Cited by the Examiner

UNITED STATES PATENTS

| | | | |
|---|---|---|---|
| 2,564,397 | 8/1951 | Duddy | 264—41 XR |
| 2,589,022 | 3/1952 | Page et al. | 264 |
| 2,687,157 | 8/1954 | Cowan | 150—0.5 |
| 2,797,443 | 7/1957 | Carlson | 264—53 XR |
| 2,826,244 | 3/1958 | Hurley | 264—54 XR |
| 2,852,054 | 9/1958 | Matley | 150—0.5 |
| 2,875,472 | 3/1959 | Marcus. | |
| 2,964,799 | 12/1960 | Roggi et al. | 264—54 XR |
| 3,012,283 | 12/1961 | Foster | 18—48 |
| 3,019,486 | /1962 | Stinson. | |
| 3,042,972 | 7/1962 | Lafferty | 264—53 |

FOREIGN PATENTS 854,586   11/1960   Great Britain.

ALEXANDER H. BRODMERKEL, *Primary Examiner.*

DONALD J. STOCKING, *Examiner.*